No. 740,051. PATENTED SEPT. 29, 1903.
C. SMITH.
VEHICLE.
APPLICATION FILED JAN. 14, 1903.
NO MODEL.
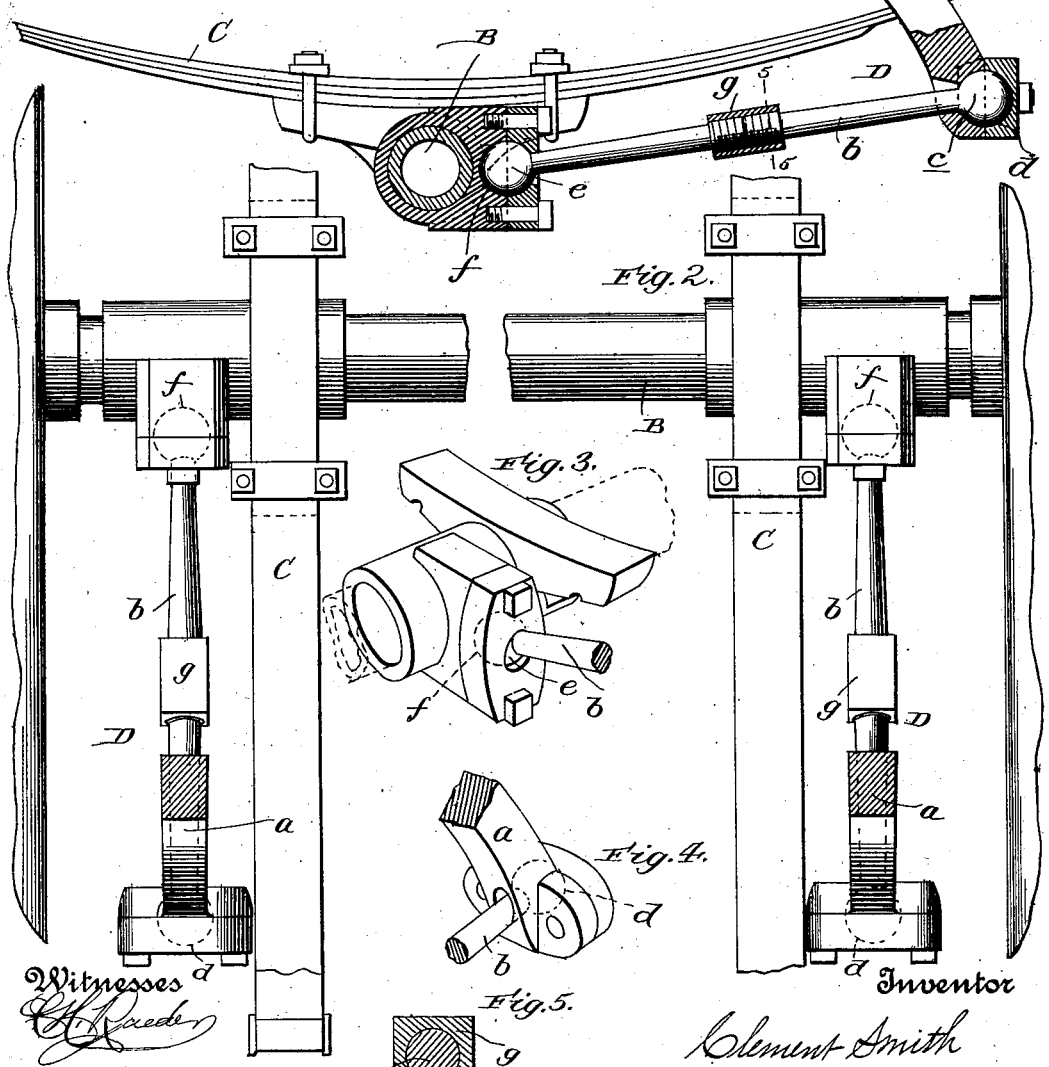

No. 740,051. Patented September 29, 1903.

UNITED STATES PATENT OFFICE.

CLEMENT SMITH, OF TOPEKA, KANSAS.

VEHICLE.

SPECIFICATION forming part of Letters Patent No. 740,051, dated September 29, 1903.

Application filed January 14, 1903. Serial No. 139,056. (No model.)

*To all whom it may concern:*

Be it known that I, CLEMENT SMITH, a citizen of the United States, residing at Topeka, in the county of Shawnee and State of Kansas, have invented new and useful Improvements in Vehicles, of which the following is a specification.

My invention relates to motor-vehicles, and has for its object to provide braces calculated to render it practical to interpose elliptic springs between the heavy bodies of such vehicles and the front axles thereof, this being advantageous because such springs are cheap and add but little to the cost of a vehicle.

With the foregoing in mind the invention will be fully understood from the following description and claims when taken in connection with the accompanying drawings, in which—

Figure 1 is a broken view, partly in side elevation and partly in section, of so much of a vehicle as is necessary to illustrate my invention; Fig. 2, a broken section taken in the plane indicated by the line 2 2 of Fig. 1; Fig. 3, an enlarged detail broken perspective view illustrating the manner in which I prefer to connect the draft-rod of my improved brace to the front axle of the vehicle; Fig. 4, a similar view illustrating the preferred manner of connecting said rod to an arm fixed with respect to the vehicle-body and forming part of the brace, and Fig. 5 an enlarged detail transverse section taken in the plane indicated by the line 5 5 of Fig. 1.

Similar letters of reference designate corresponding parts in all of the views of the drawings.

A is the body of a motor-vehicle; B, the front axle thereof; C C, elliptic springs, disposed longitudinally of the vehicle and interposed between and connected to the body and the axle; and D D my improved spring-braces, of which two are employed, one in conjunction with each spring. The braces are similar in construction, and therefore a detailed description of the one shown in Fig. 1 will suffice to impart an understanding of both. Said brace comprises an arm $a$, preferably of steel or Norway iron, fixedly connected to the body A, preferably at a point above the axle B, and extending downwardly from said body and longitudinally of the vehicle and forwardly to a point in a horizontal plane slightly above that of the axle B and in front of said axle, and a draft-rod $b$, also preferably of steel, disposed longitudinally of the vehicle and interposed between the axle B and the arm $a$. The arm $a$ is arranged so that its lower end rests in advance of the front axle, as plainly shown in Fig. 1. The draft-rod $b$ is provided at one end with a ball $c$, disposed in a socket $d$ in the arm $a$, and at its opposite end with a ball $e$, disposed in a socket $f$, carried by the axle B. Said rod may be formed in one piece without involving a departure from the scope of my invention, although I prefer to have it comprise two sections provided with screw-threads and connected by a threaded union $g$, as shown—this in order that it may be readily adjusted as to length and more readily secured between the axle B and arm $a$ and removed therefrom, also to permit of wear between the rod and the axle and arm $a$ being taken up, with a view of preventing rattling. A plain rod hinged to the axle and the arm $a$ may be employed with good results.

In virtue of the provision of my improved braces in conjunction with elliptic springs interposed between a vehicle-body and front axle it will be observed that the body is free to move up and down on the springs and tilt both laterally and longitudinally, and yet is securely held against endwise movement with respect to the axle—*i. e.*, is prevented from pitching either backward or forward. From this it follows that without in any way interfering with the efficiency of the springs C the braces D serve to pull the front axle, thereby avoiding the use of a reach between the rear and front axles and at the same time avoid the pulling of the front axle by the springs. This latter is an important advantage, since when the front axle is pulled by the springs the wear and tear on the springs is greatly increased, and they are liable to break and cause damage. It will also be observed that the braces serve an important function incident to backing of the vehicle—*i. e.*, the arms $a$ thrust the rods $b$ against the front axle, and thereby prevent the body from pulling longitudinally on the springs. In virtue of the arms $a$ of my improved braces being connected to the body and extending downwardly and longitudinally from the points of connection it will be observed that the thrust which the body exerts against the said arms is in the direction of the length of the latter, and hence there is no liability of the arms being broken in practice.

While my improved braces are designed more particularly for use in conjunction with elliptic springs with a view of rendering practical the employment of such springs between heavy vehicle-bodies and axles, I desire it distinctly understood that the braces may, when deemed advantageous, be used in conjunction with springs of any kind without involving a departure from the scope of my invention.

Having described my invention, what I claim, and desire to secure by Letters Patent, is—

1. In a motor-vehicle, the combination of a front axle, a body, one or more springs interposed between and connected to the axle and the body, arms fixedly connected to the body, and extending downwardly and longitudinally forward therefrom to a point in front of and in about the same horizontal plane as the axle, and longitudinal draft-rods interposed between and connected to the axle and the lower ends of the arms.

2. In a motor-vehicle, the combination of a front axle, a body, longitudinal, springs interposed between and connected to the axle and the body, arms fixedly connected to the body, and extending downwardly and longitudinally forward therefrom to a point in front of and in about the same horizontal plane as the axle, longitudinal draft-rods interposed between the axle and the lower ends of the arms, ball-and-socket connections between said rods and the axle, and ball-and-socket connections between the lower ends of the arms and the rods.

In testimony whereof I have hereunto set my hand in presence of two subscribing witnesses.

CLEMENT SMITH.

Witnesses:
GEO. E. STOVER,
L. H. GREENWOOD.